Dec. 17, 1968 K. KOCHER 3,417,342

AUTOMATIC FREQUENCY CONTROL SYSTEM

Filed May 29, 1967 3 Sheets-Sheet 1

United States Patent Office 3,417,342
Patented Dec. 17, 1968

3,417,342

AUTOMATIC FREQUENCY CONTROL SYSTEM

Klaus Kocher, Ditzingen, Germany, assignor to International Standard Electric Corporation Filed May 29, 1967, Ser. No. 641,974
Claims priority, application Germany, June 3, 1966, St 25,486
5 Claims. (Cl. 331—12)

ABSTRACT OF THE DISCLOSURE

An automatic frequency control system for maintaining the integrity of carrier frequencies. The controlled frequency is compared first to a standard frequency and then to the standard frequency phase shifted 90°. The comparison provides a two phase rotating field. The direction of rotation indicates the direction of frequency deviation. A transfluxor and varactor are used to restore the controlled frequency responsive to a D.C. voltage obtained from the rotating field.

The invention relates to a system for automatically controlling a voice or radio frequency oscillator with respect to a standard frequency electronically.

Automatic frequency control systems are known wherein when a first beat frequency between frequency $f_x$ and a standard frequency is obtained in a modulator and a second beat frequency $f_n$ is obtained by phase shifting the standard frequency to 90° in a phase shifter prior to a modulator, a two-phase rotating field is obtained with a frequency $f_x—f_n$. The rotational direction of the field depends on which of the two frequencies is the higher. The rotational direction of the field determines the direction in which the oscillator of the frequency $f_x$ must be tuned, to set frequency $f_x$ to the value of the frequency $f_n$. This two phase current can be used for driving servomotors to actuate one of the tuning elements of the controlled oscillator thereby controlling the frequency. Such a A.F.C. device operates in a satisfactory way, however, only within the rather narrow range of the beat frequency $\Delta f$. Since on one hand, relatively high beat frequencies must be assumed after failure of the oscillator and/or of the standard frequency, while on the other hand, the adjustment of the frequency $f_x$ to the standard frequency $f_n$ must be made with high accuracy which may be a small fraction of one single cycle per second, therefore such an adjusting device is unsuitable. Such a servo motor also requires a certain amount of maintenance. Therefore, an object of this invention is to avoid such servo tuning devices and to use electronic means only.

It is known to determine small shifts of a frequency with respect to a standard frequency in the AF or RF range, by multiplying the first frequency and the standard frequency by a factor differing by one and forming the beat frequency in a modulator. At the output terminals of the modulator, a frequency is obtained having the same position as the standard frequency $f_x$. However, the absolute value of the frequency shift has been increased by the multiplying factor used. By iterations of this process very small frequency shifts between the first frequency $f_x$ and the standard frequency $f_n$ can be multiplied to obtain an amount suitably measurable by a conventional frequency indicator.

The automatic frequency control can be combined with the arrangement described immediately above. However, the combination would still use the servo drive and be relatively expensive.

It is an object of the invention to provide a system for the control of an AF or RF oscillator with respect to a standard frequency, by electronic means. In the system the amount of the frequency shift can be multiplied in a single stage or in several stages and the beat frequency obtained by mixing. Thereupon a first beat frequency is formed with the standard frequency and a second beat frequency is formed with a frequency, phase-shifted to the standard frequency by 90°, giving a two-phase alternating current forming a rotating field. The direction of the frequency shift of the first frequency with respect to the standard frequency is determined through the rotational direction of said field.

The problem is solved, according to the invention, in that from the zero crossovers a pulse frequency is derived, being equal in repetition rate to the first beat frequency. The pulse frequency and the second beat frequency are fed to the inputs of a switching device, at the output of which a pulse train appears. The polarity of the pulses corresponds to the phase of the second beat frequency with respect to the first beat frequency. Also, the distribution of the two beat frequencies to one of two outputs corresponds to said phase respectively, having a repetition rate equal to the two beat frequencies. The pulse train is led to the input of a transducer, which furnishes at its output a DC-control voltage proportional in amplitude to the repetition rate of the pulse train and consequently to the beat frequency. The incremental direction of said DC-control voltages is determined by the polarity of the second beat frequency with respect to the leading or the trailing edge of said pulses. A reactance element inserted in the AF or RF oscillator is actuated by said DC-control voltage.

The invention will now be described in detail with the aid of the accompanying drawings wherein:

FIG. 1 shows in block diagram form a prior art arrangement for providing a two-phase rotating field;

FIG. 2 graphically shows the two fields;

Figure 1:
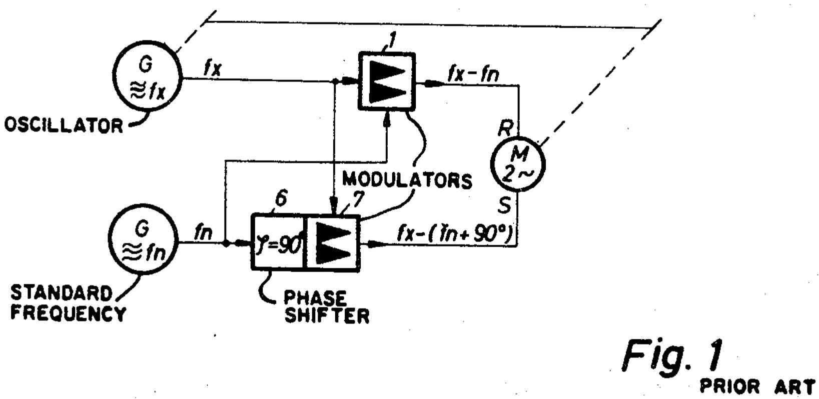
Fig. 1 PRIOR ART
Figure 2:
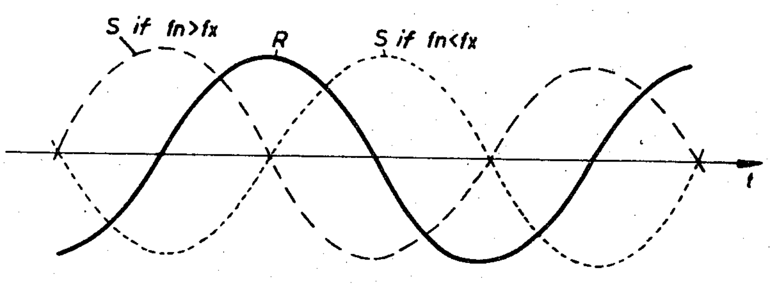

FIG. 1 shows an arrangement wherein the magnitude of frequency shift is given by the value of the beat frequency $f_x—f_n$. The frequency shift direction of the first frequency $f_x$ with respect to the standard frequency $f_n$, and which of the frequencies $f_x$ or $f_n$ is the higher one, is determined by the sense of the rotating field of the two alternating currents R and S. It is the object of the present invention to provide the means for transducing the beat frequency signal into a DC-voltage electronically. The magnitude of the D.C. voltage depends in magnitude on the magnitude of the frequency shift and in progressive direction on the shift direction. With the aid of the DC-voltage, the frequency of the controlled oscillator can be tuned with a high synchronous accuracy to the frequency $f_n$.

Figure 3:
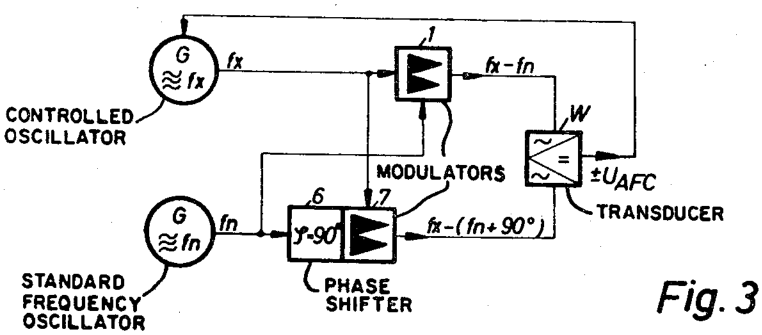
FIG. 3 shows in block diagram form the present invention and preferred embodiment of the invention.

The transducer W, shown in FIG. 3 shall also furnish a control DC-voltage, if the difference frequency $f_x—f_n$ is very small. The repetition rate of the beat frequency can be seconds, minutes or even hours. The necessity for a satisfactory control at low beat frequencies is shown in the following example. It may be required to keep a frequency $f_x$ of 60 kc./s. with a standard frequency $f_n$, synchronous with an exactitude of at least $10^{-6}$. From these figures, it is apparent that therefrom results a minimum repetition rate of the beat frequency of 15*s*. The oscillator, furnishing the frequency $f_x$ shall maintain its adjusted frequency within its thermic stability, even if the nominal frequency $f_n$ fails for a certain time, under circumstances even for a longer time. A direct synchronization of the generator, furnishing the frequency $f_x$, with the nominal frequency $f_n$ is then impossible.

It would be desirable to have a real integrating mode of operation of such a control arrangement that wide shift would be countered with high control speed and small control speeds would be used for small frequency shifts. This arrangement is especially advantageous to obtain a rapid adjustment when the control device is switched on. However, another advantage is that very small changes during continuous operation means the avoidance of unnecessary hunting within the control system. It is also desirable to eliminate the control dead range which always results in a servo control.

Figure 4:
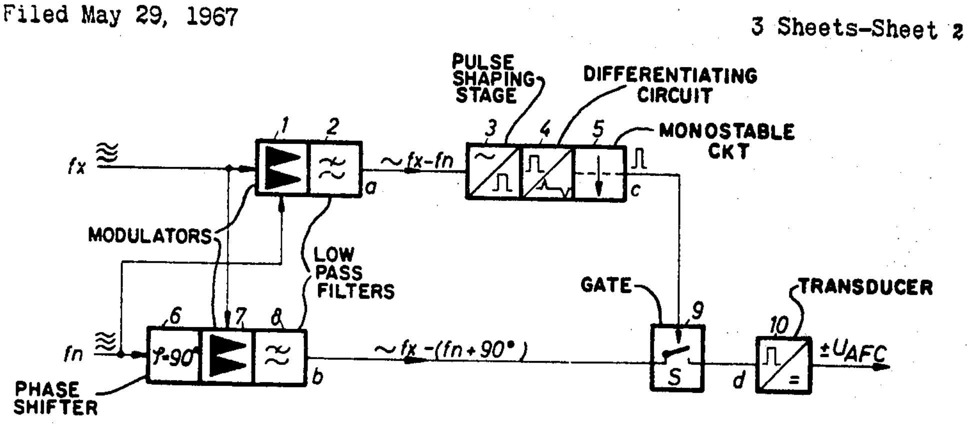
FIGS. 4 and 5 show in block diagram form two alternate embodiments of the present invention.
Figure 6:
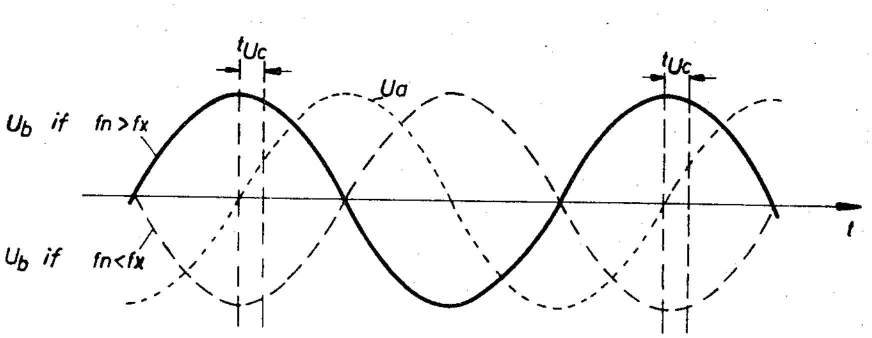
FIG. 6 is a diagram to explain the function of the arrangements of FIGS. 4 and 5.

In FIG. 4 a first beat frequency $a=f_x-f_n$ is formed from the controlled frequency $f_x$ and the standard frequency $f_n$, by means of a first modulator 1. The frequency $f_x$, and the standard frequency after a 90° phase shift $f_n+90°$ is fed to a second modulator 7, and a second beat frequency $b=f_x-(f_n+90°)$ is formed. Both beat frequencies $a$ and $b$ have a relative phase shift of 90°, thus forming a two-phase A.C. rotating field, the rotational direction of which indicates which of both frequencies $f_x$ or $f_n$ is the higher frequency. The shift direction of the frequency $f_x$ with respect to the standard frequency $f_n$ can be determined from the polarity of the second beat frequency, phase shifted 90° with respect to the first beat frequency at the moment of positive going zero crossing of the first beat frequency $a$. In this case, the positive amplitude of the second beat frequency $b$ at the moment of positive going zero crossing of the first frequency $a$ indicates $f_n>f_x$ and a negative amplitude indicates $f_x>f_n$. FIG. 6 explains these conditions. From the foregoing explanations it can be assumed that instead of the positive going zero crossing of the first difference frequency $a$, the negative going zero crossing can be selected. Positive amplitudes of the second beat frequency $b$ means in this case that $f_x>f_n$ and negative amplitudes means that $f_n>f_x$.

A reversion of these relations is given, if $f_n$ is not shifted advancing, i.e. by +90°, but retarding, i.e. −90°. For a phase shift of the frequency $f_x$ by +90° or −90° at a non-delayed standard frequency $f_n$ the above considerations apply in the same way, making a detailed explanation unnecessary. In the following example, a phase shift of +90° of the standard frequency $f_n$ is assumed. Also the positive going zero crossing of the first difference frequency $a$ is used as the reference.

The first and the second beat frequency $a$ and $b$ is derived from the modulator 1 or 7 respectively via a lowpass filter 2 or 8, respectively. These lowpass filters do not pass some frequencies, residual parts of the frequencies $f_x$ and $f_n$ and the other undesired modulation products. The beat frequency $a$ is thereupon converted into a pulse frequency equal to the repetition rate in a pulse shaping stage 3. Such a conversion can be made, in a way known per se, by limiting the alternating voltage or more suitably by controlling a monostable multivibrator, preferably in the known configuration of a Schmitt-trigger stage. Differentiating in a differentiating circuit 4 provides a bipolar sharp pulse train corresponding to the zero passages of the beat frequency $a$ in the repetition rate. Thereby the position of the sharp pulses corresponds to the position of the zero passage and the polarity of the sharp pulses correspond to the positive going zero crossing of the difference frequency $a$. A monostable circuit 5 is actuated by the output of the differentiating circuit. The monostable furnishes at its output a rectangular pulse sequence equal to the repetition rate of the beat frequency $a$. As best seen in FIG. 6, the pulse width $t_{u_c}$ is small compared to the period of the highest difference frequency $a$ to be processed. The rectangular pulse train $c$ (the output of circuit 5) controls a gate 9. A control impulse (such as the second beat frequency $b$) applied during the time $t_n$ to the input of said gate 9, can pass.

A pulse train $d$ is obtained at the output of the gate stage 9. The repetition rate of the pulses of train $d$ is equal to the first beat frequency $a$, whereby the pulse width is $t_{u_c}$ and its polarity depends on whether $f_x>f_n$ or $f_n>f_x$ respectively. The amplitude of the pulses thereby corresponds to the amplitude of the beat frequency $b$, whereby the amplitude of this pulse train corresponds to the instantaneous amplitude of the second beat frequency $b$ at the time of the pulse width $t_{u_c}$.

The pulse train $d$ is fed to a transducer 10 which derives from said pulse train a control DC-voltage having an amplitude which is a function of the repetition rate of the beat frequency $a$ or $b$ respectively, and of the incremental direction, determined by the polarity of the amplitude of the second beat frequency $b$ at the time $t_{u_c}$ of the pulse train. The transducer 10 could be realized in the simplest case by an RC integration device provided after an amplitude limiter device 10 furnishes a DC-voltage $\pm U_{AFC}$ being proportional in amplitude and polarity to the repetition rate and to the polarity of the amplitude of the second difference beat $b$ at the scanning moment $t_{u_c}$. To provide such an integrating device having a sufficient time constant even for very small frequency deviations means that a very large repetition period of the pulses would be difficult. Moreover, the standard frequency should fail only during so short a time within which a practically negligible amplitude decrease of the charging voltage of the integrating device occurs. The energy required for the control must be covered by the pulses if no powerless control is concerned. Thereby a complete synchronization between the frequency to be regulated and the standard frequency is impossible. Today conventional circuit arrangements contain transistor and a certain control energy is required. Moreover, for a varactor diode, such as are presently conventionally used as reactance elements, it is not desirable to have a bipolar voltage available as a control voltage, because these diodes operate in the cut-off direction. A control voltage variable in both directions of a defined basic voltage without change of polarity would be more favorable. These problems, however, will be discussed later and advantageous solutions will be given. But it is emphasized that the arrangement hitherto described with the aid of FIG. 4 furnishes results at least equivalent to those obtained with other known arrangements.

Figure 5:
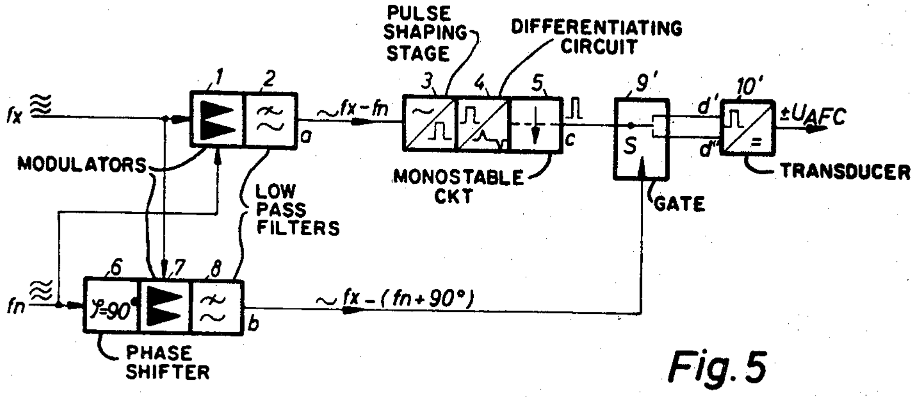

The arrangement shown in FIG. 5 differ from the one shown in FIG. 4 only in that a gate 9' is controlled by the second beat frequency $b$ and the input of the gate is connected with one of the two outputs, depending on the polarity of the half waves of the controlling beat frequency. The pulses furnished by the monostable multivibrator 5 are applied to one or the other output, corresponding to the polarity of the second beat frequency $b$ at the moment $t_{u_c}$. The pulse frequency $d'$ or $d''$ appearing at one of the two outputs depending on the direction of the frequency shift is converted in a transducer 10' into a control DC-voltage functionally depending in magnitude from the repetition rate, i.e. the beat frequency $a$ or $b$ and in its increment functionally depending from the frequency shift direction defined by the polarity of the amplitude of the second beat frequency $b$ at the moment $t_{u_c}$ of the pulse train $c$. Here too, the simplest construction of the transducer 10' may comprise an integrating device which directly receives the pulse train $d'$ or $d''$ respectively and the pulse sequence $d''$ or $d'$ respectively after phase inversion. Here, also applies what was said during the description of FIG. 4 with regard to the operation of an integrating device.

Figure 7:
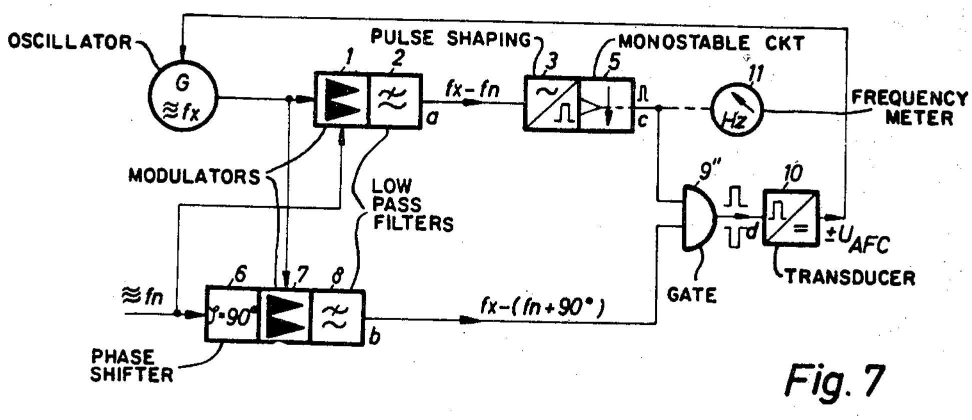
FIGS. 7 and 8 show circuit arrangements to carry out the method for each of the alternate solutions.
Figure 8:
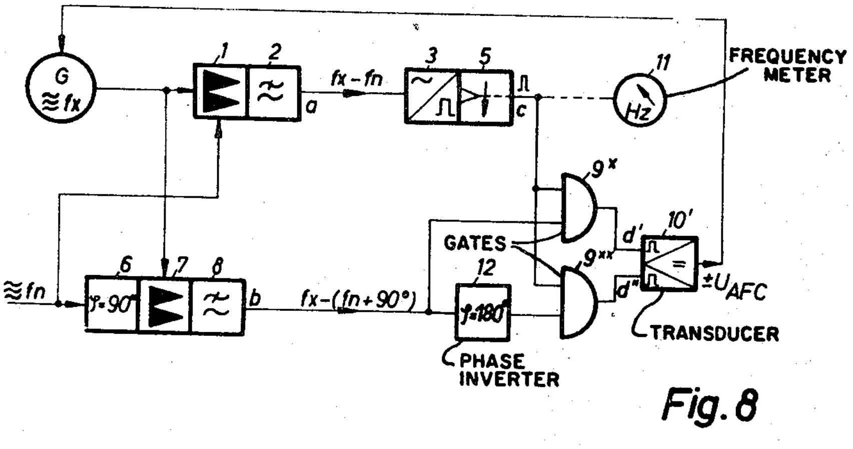

FIGS. 7 and 8 show how to design the arrangements according to FIGS. 4 and 5 whereby FIG. 7 corresponds to FIG. 4 and FIG. 8 corresponds to FIG. 5. The same components have the same references, being the same in function but differing from each other with regard to the design which is indicated by indices. Box 3 represents a Schmitt-trigger as already shown in FIG. 4. The monostable multivibrator 5 has a differentiating input so that it is actuated only by the rising or trailing edge of the rectangular wave, furnished by the Schmitt trigger 3. Such monostable multivibrators with differentiating input are known per se, thus requiring no description.

For supervising purposes a frequency meter 11 can be connected. It is controlled by the rectangular pulse train *c*, furnished by the monostable multivibrator 5. The frequency meter shows the absolute amount of the frequency difference. In FIG. 7, parts of the bipolar signals applied to the input terminals of gate 9''. The signals at the output terminals of gate 9 depend on the pulses of the pulse train *c* during the time $t_{uc}$. Such gate circuits are known from the pulse modulation technique, particularly from the pulse amplitude modulation. $\mathbf{9^x}$ and $\mathbf{9^{xx}}$ are gate circuits in FIG. 8, known as AND gates which let pass a unipolar signal, applied to their input only then, when also a signal of same polarity is applied to their control input. By means of phase-inverter stage 12 a signal of correct polarity is applied to the control input of the AND-gate $\mathbf{9^{xx}}$, required for a through-switching, if the second beat frequency *b* shows a polarity at the moment $t_{uc}$ blocking the gate circuit $\mathbf{9^{xx}}$, whereby the gate circuit $\mathbf{9^{xx}}$ can now become conductive, while the gate circuit $\mathbf{9^x}$ remains non-conductive. Depending on the polarity of the amplitude of the second difference frequency *b* at the moment $t_{uc}$ the pulses, furnished by the monostable multivibrator 5, can pass through the AND-gate $\mathbf{9^x}$ or the AND gate $\mathbf{9^{xx}}$ respectively.

The prior description of FIGS. 4 and 5 considered the transducer 10 or 10', whereby it was pointed out that its realization as an integrating device is possible under certain limitations.

For example, the standard frequency $f_n$ can fail only for a short time without simultaneously causing an inadmissibly high detuning of the frequency $f_x$. If the possibility of a failure of the standard frequency $f_n$ must be considered for a certain period, it is necessary that the value of the control voltage, having existed before the failure, remains stored until the nominal frequency $f_n$ returns so that the frequency of the generator, producing the frequency $f_x$ can change, only within the thermal stability of this generator during the failure. For such a storing of pulse train *d*, for which the storing direction would be marked by a polarity, or the pulse trains *d'* and *d''* would be available, whereby each of said latter frequencies already contain the information on the storing direction. A step by step motor with servo adjusting potentiometer, a forward and backward counter electronic storage device formed by bistable multivibrators and an annular core memory with corresponding reading device or preferably a transfluxor storage unit with reading device may be used as such a storage device. Step by step motors with servo adjusting potentiometer represent the simplest arrangement, but nowadays the use of mechanically moving components requiring service, are refused if such equipment can be avoided with a reasonable additional expenditure.

The use of electronic storage devices formed by bistable multivibrators not only is unduly expensive in components but also only a limited number of steps can be realized at all. Since the storage position set is marked by current or voltage values, gained by summing up the units, furnished from the individual steps or stages and associated with them in their value, the possible tolerances of these units limit an arbitrary increase of the number of steps. If the lowest valued unit is within the tolerance of the highest valued unit, a further subdivision renders no technical gain. The same applies for the core memories. Since electronic switch stages are required for reading the contents of said storages without destroying them, the reading facility prevents a further subdivision of the storing steps beyond a certain value.

Figure 9:
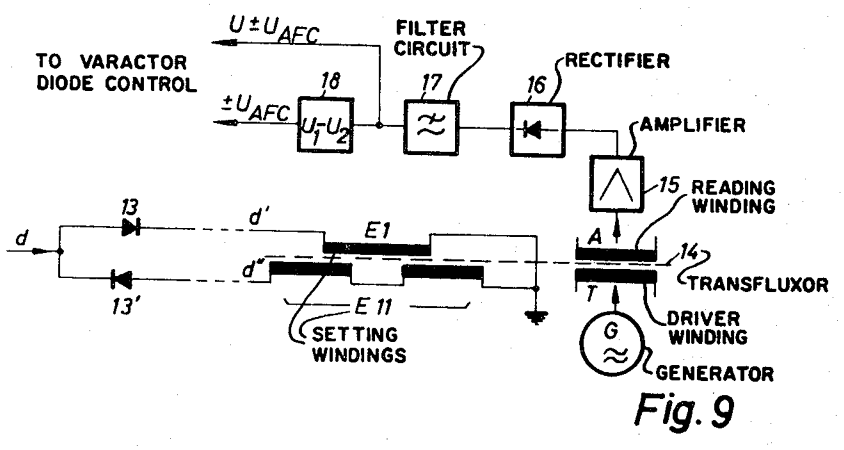
FIG. 9 shows an advantageous arrangement for deriving the control voltage.

For the present problem the use of a transfluxor as a storing device in cooperation with varactor diodes as controlling components offers particular advantages for frequency adjusting. FIG. 9 shows such a transfluxor arrangement. Unit 14 represents a transfluxor with the setting windings E1 and E11, the driver winding T and the reading winding A. Core and windings are designed according to the teachings of the pending U.S. patent application, Ser. No. 619,828 filed Mar. 1, 1967, entitled "Arrangement To Prevent the Flux Inversion in a Magnetizable Element" and assigned to the assignee of this invention. Thus, measures are taken to prevent reverse of the flux direction in the strap comprising the little aperture, which otherwise would cause an ambiguity of the contents stored.

G is the generator, furnishing the driver alternating current. The voltage induced by the driver winding T on the reading winding A, depending on the permanent flux set, is amplified in amplifier 15, if so required, rectified in a rectifier arrangement 16 and the thus gained DC-voltage is smoothed in a filter circuit 17. Since the operating point is in general, the center between the flux zero and the saturation of the rising portion of the hysteresis curve, a unipolar control DC-voltage $U_{AFC}$ is obtained in rear of the filter chain 17. The D.C. voltage deviates from a frequently imaginative average value in the increasing and decreasing direction, corresponding to the size of the frequency deviation and its direction. Therefore, for the control voltage $U_{AFC}$ practically the value zero and at a magnetic flux zero the maximum value, determined by the excitation of the driver winding and the transformation ratio $T{:}A$. Such a control voltage would be suitable for the operation of a varactor diode which is biased to operate in the cut-off direction. If a bipolar control voltage is required this control voltage $U_{AFC}$ could be derived, in a differential amplifier by means of a reference voltage in a way known per se, from the control voltage $U_{AFC}$.

In the example, the permanent flux in the transfluxor is set by pulses of a constant width. This is normally unfavorable for the step by step setting of the permanent flux of a transfluxor, because, depending on the permanent pre-excitation, the length of the reversible range differs and consequently, also the time within which this reversible range is passed. Near the zero point of the flux such impulse causes greater steps of the permanent flux variations near the saturating point. In order to achieve uniform changes of steps of the permanent flux in a transfluxor, a number of other setting methods have been indicated. A varactor diode is used as a controlling component for the frequency. Adjusting the capacity change by the change of the applied operating cut-off voltage so that the capacity decreases with an increasing cut-off voltage, the otherwise disadvantageous attitude of a transfluxor at a step by step setting of the permanent flux through pulses of a constant width is advantageous. The advantage occurs because a control voltage occurs which has a curve that corresponds with a proper approximation to the curve of a varactor diode, required for a linear change of capacity.

Such a curve can be obtained in a relatively simple manner when using a step switch motor through a corresponding characteristic for the driven potentiometer. For storage devices formed by bistable multivibrator or for an annular core memory such a curve either requires a storage unit for each step which means the arrangement of a decadic system, having binary or other storage limits, is not possible or an expensive logic must be inserted after such storages through which logic the desired curve is obtained.

If the use of servo mechanical components with moving parts such as step by step switch motor with adjusting potentiometer is not desired, the use of a transfluxor arrangement as shown in FIG. 9 as an example is advantageous because the frequency $f_x$ is maintained, if the standard frequency $f_n$ fails within the limits of the thermic stability. The transfluxor also furnishes the adjusting control voltage $U_{AFC}$ for the frequency control varistor diode through which the control is obtained within the operating range in proportion to the beat frequency *a*.

For frequency control according to the inventive method the following points of design must be considered when using the described transfluxor storage device. By selecting the pulse period $t_{uc}$ of the monostable multivibrator, the amplitude of the pulses and the transfluxor material with reference to the inclination of the hysteresis loop (deviation from the ideal rectangular loop), the setting pulses near the saturation knee of the hysteresis loop can be prevented from running into the irreversible part of the hysteresis loop. Thus, near the flux zero point of the hysteresis loop, the smallest steps occur. The difference in the adjusting stages near the saturation and the zero flux determined by the inclination, determines the non-linearity of the control voltage. It is possible to alter the characteristics of the control voltage by suitably varying these parameters, so that in cooperation with the characteristic of the varactor diode, the variation of the frequency to be controlled is proportional to the frequency shift. It is also possible to obtain such small steps of the control voltage variation that the frequency can be shifted in steps smaller than a fraction of the predetermined tolerance.

For the value of the admissible tolerance, serving as an example, a crystal controlled oscillator is used for producing the frequency $f_x$, whereby the capacitance of the varactor diode is used as a trimming capacitor or as a part of said trimming. With arrangements as described, the time interval between the individual adjusting steps can be controlled to be one or several hours long. It is also obvious that with the control methods hitherto known this problem could not have been solved. With arrangements according to the inventive method all requirements, specified in the preamble, can be realized sufficiently.

While the principles of the invention have been described above in connection with specific apparatus and applications, it is to be understood that this description is made only by way of example and not as a limitation on the scope of the invention.

I claim:

1. An automatic frequency control system for electronically controlling the output frequency of an oscillator with respect to a standard frequency, first modulator means for providing a first beat frequency obtained by mixing said oscillator and said standard frequency, means for shifting said standard frequency by 90°, second modulator means for providing a second beat frequency using said oscillator frequency and phase shifted standard frequency, said first and second beat frequencies giving a two-phase alternating current forming a rotating field, means for obtaining a pulse frequency from the zero cross-overs of said first beat frequency, said pulse frequency being equal in repetition rate to the first beat frequency and representing the magnitude of the deviation of the oscillator from the standard frequency, means for connecting said pulse frequency and the second beat frequency to the inputs of a switching device, said switching device providing a pulse train output wherein the polarity of the pulses of the output pulse train corresponds to the phase of the second beat frequency with respect to the first beat frequency and represents the direction of the deviation of the oscillator from the standard frequency, transducer means operated responsive to said train to furnish a control DC-voltage proportional in amplitude to the repetition rate of the pulse train and of a polarity determined by the polarity of the second beat frequency, and means making said control DC-voltage available to regulate the oscillator output frequency.

2. The automatic frequency control system of claim 1 wherein said transducer means comprises forward-and-backward counting storage means and means for setting said storage means responsive to said pulse train.

3. The system of claim 2 wherein said storage means comprises a transfluxor storage unit, and reading facility means associated with said storage device.

4. The system of claim 3 wherein said transfluxor storage unit comprises a core having a material with an inclined hysteresis loop such that the non-linearity of the control DC-voltage caused by inclined hysteresis loop and furnished by the reading device linearizes the non-linear characteristic of the reactance element used and the frequency control is directly proportional to the repetition rate of the beat frequency.

5. The system of claim 4 wherein said reactance element comprises a varactor diode and wherein the capacitance of said varactor diode is a portion of a capacitor used for trimming the frequency of a crystal-stabilized oscillator generating the oscillator frequency.

References Cited

UNITED STATES PATENTS

| | | | |
|---|---|---|---|
| 2,473,853 | 6/1949 | Boykin | 331—12 |
| 2,702,852 | 2/1955 | Briggs | 331—12 |
| 3,076,943 | 2/1963 | Cooperman | 331—36 |

JOHN KOMINSKI, *Primary Examiner.*

U.S. Cl. X.R.

331—17, 36, 14